(12) United States Patent
Graf et al.

(10) Patent No.: US 12,386,647 B2
(45) Date of Patent: Aug. 12, 2025

(54) VIRTUALIZATION MANAGEMENT SYSTEM AND/OR OPERATING SYSTEM ATTESTATION FROM WITHIN A VIRTUALIZED COMPUTING INSTANCE

(71) Applicant: Amazon Technologies, Inc., Seattle, WA (US)

(72) Inventors: Alexander Graf, Nuremberg (DE); Ioannis Aslanidis, Berlin (DE); Deepak Gupta, Sammamish, WA (US); Jonathan Daniel Bean, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 563 days.

(21) Appl. No.: 17/809,859

(22) Filed: Jun. 29, 2022

(65) Prior Publication Data
US 2024/0004681 A1    Jan. 4, 2024

(51) Int. Cl.
*G06F 9/455*     (2018.01)
*G06F 21/44*     (2013.01)
*G06F 21/57*     (2013.01)

(52) U.S. Cl.
CPC .......... *G06F 9/45558* (2013.01); *G06F 21/44* (2013.01); *G06F 21/57* (2013.01); *G06F 2009/45587* (2013.01)

(58) Field of Classification Search
CPC ...... G06F 9/45558; G06F 21/14; G06F 21/57; G06F 2009/45587
See application file for complete search history.

(56) References Cited

U.S. PATENT DOCUMENTS 5,564,060 A    10/1996   Mahalingaiah et al.
6,115,779 A     9/2000   Haubursin et al.
(Continued)

OTHER PUBLICATIONS

"9.2 Handling Interrupts—Chapter 9 Advance Issues", Retrieved from URL: http://www.jungo.com/st/support/documentation/windriver/10.2.0/wdpci_manual.mhtml/Handling_Interrupts.html on Jan. 10, 2019, pp. 1-15.

(Continued)

*Primary Examiner* — Viet D Vu
(74) *Attorney, Agent, or Firm* — Alexander A. Knapp; Kowert, Hood, Munyon, Rankin & Goetzel, P.C.

(57) ABSTRACT

A virtualized computing service provides a computing instance capable of requesting attestation of the authenticity of the hypervisor implementing the computing instances. An attestation device included in a virtualization host maintains a log of hash values representing hypervisor versions that have been implemented at the virtualization host. Also, an independent auditor (e.g., attestation service) is provided software configurations that are known to be authentic. The independent auditor generates hash values for the authentic hypervisor versions. The computing instance receives a response from the local attestation device indicating hash values of hypervisor versions currently and/or previously deployed on the virtualization host, and the computing instance forwards the hash values to the independent auditor to authenticate that they match the hash values of the known authentic hypervisor versions. In some embodiments, a similar process may also be used to attest to the authenticity of operating systems used by the computing instance.

20 Claims, 10 Drawing Sheets

(56) References Cited

U.S. PATENT DOCUMENTS

| | | |
|---|---|---|
| 7,000,051 B2 | 2/2006 | Armstrong et al. |
| 2005/0183093 A1 | 8/2005 | Pope et al. |
| 2008/0126648 A1 | 5/2008 | Brownlow et al. |
| 2013/0318595 A1* | 11/2013 | Wang ..................... G06F 21/44 726/16 |
| 2020/0026858 A1* | 1/2020 | Subramanian .......... G06F 21/64 |

OTHER PUBLICATIONS

"Chapter 7 Interrupts and Interrupt Handlers—Shichao's Notes", Retrieved from URL: https://notes.shichao.io/lkd/ch7/ on Jan. 5, 2019, pp. 1-26.

"Introduction to Message-Signaled Interrupts" Retrieved from URL https://docs.microsoft.com/en-us/windows-hardware/drivers/kernel/introduction-to-message-signaled-interrupts on Jan. 10, 2019, pp. 1-2.

"irqbalance(1)—Linus man page", retrieved from URL https://linux.die.net/man/1/irqbalance on Jan. 11, 2019, pp. 1-3.

PCI Express, "PCI Express Base Specification Revision 3.0", Nov. 10, 2010, pp. 1-17.

\* cited by examiner

Attestation request from computing instance to attestation device
602

- request for attestation package
- unique request-identifier (e.g. nonce word)
- timestamp

*FIG. 6*

Response from attestation device to competing instance
702

- cryptographic signature of attestation device
- repetition of unique request identifier
- current software configuration identifier
- log of previous software configuration identifiers
- platform configuration registry PCR
- timestamp

*FIG. 7*

VIRTUALIZATION MANAGEMENT SYSTEM AND/OR OPERATING SYSTEM ATTESTATION FROM WITHIN A VIRTUALIZED COMPUTING INSTANCE

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine. Similarly, a single physical storage device may be used to store data objects/items of several different customers, e.g., in respective virtualized storage containers.

BRIEF DESCRIPTION OF DRAWINGS

FIG. 6 illustrates contents of an example attestation request sent from a computing instance to an attestation device, according to some embodiments.

FIG. 7 illustrates example contents of a response (e.g., attestation package) provided to a computing instance from an attestation device, according to some embodiments.

Figure 1:
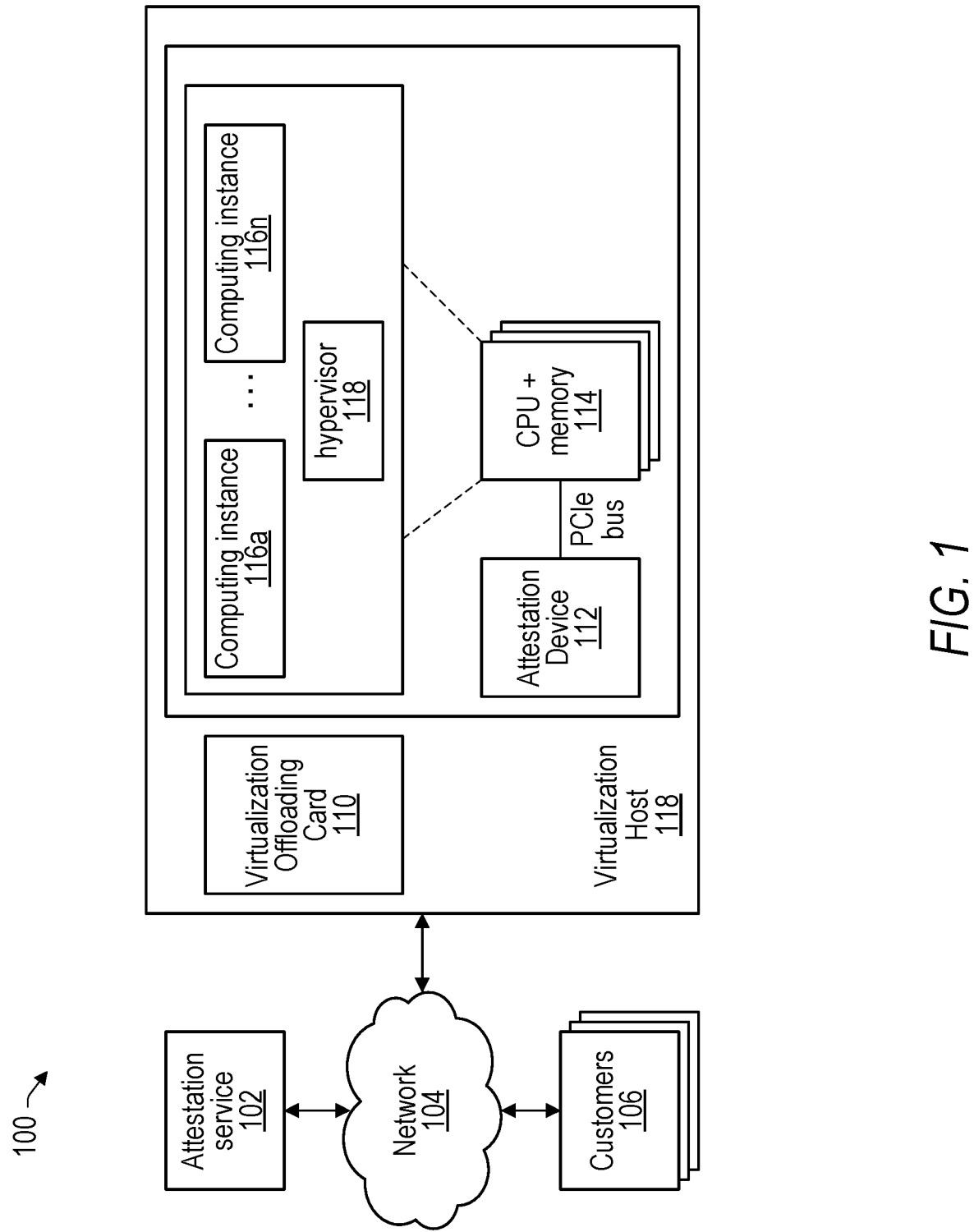
FIG. 1 illustrates an example system environment in which a virtualization host includes an attestation device configured to receive an attestation request from within a computing instance and provide an attestation package back to the computing instance, wherein the computing instance forwards the attestation package to an independent attestation service to authenticate a software configuration (e.g. hypervisor and/or operating system) implemented on the virtualization host, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for attesting a virtualization configuration (e.g., hypervisor and/or operating system) used to implement a virtualized computing instance (which may also be referred to as a virtual machine or VM) from within the virtualized computing instance. In some embodiments, an attestation device is included in a server chassis with other components of a virtualization host, such as memory, storage, central processing units (CPUs), etc. The attestation device may be mounted on a same printed circuit board (PCB) with the CPU(s) and may be connected to the CPU(s) via a communications bus. In at least some embodiments, an attestation device may communicate with other components of the virtualization host (e.g., CPU(s)) using a peripheral interconnect, such as an interconnect compliant with a version of the PCI (Peripheral Component Interconnect) or PCIe (Peripheral Component Interconnect-Express) standard. The attestation device may be installed in the virtualization host prior to the virtualization host being used to host a computing instance. Also, the attestation device may maintain a log of all versions of a hypervisor previously installed on the virtualization host, or in embodiments in which the attestation device is used to attest authenticity of an operating system, the attestation device may additionally or alternatively maintain a log of operating system (OS) versions. In some embodiments, the attestation device further maintains a platform configuration registry (PCR). The log of the previous versions (either of the hypervisor, operating system, or both) may include hash values that are generated based on applying a hash function to a given version of the hypervisor source code (or operating system source code). The hash value may uniquely represent a given version of the hypervisor source code (or operating system source code). For example, copies of the same version of the hypervisor when passed through the hash function will result in a same hash value, but if the versions are not the same (e.g., one has been altered relative to the other), the differing versions will result in different hash values. Also, the current value of the PCR is determined by inputting a previous value of the PCR and a hash value for a latest version of the hypervisor (or operating system) as inputs to a hash function that generates the current PCR value. In this way, a PCR value is generated that requires sequentially applying each hash value generated for each update to a hypervisor (or operating system) to a previous PCR value. If any hash value is omitted or applied in a different order, the current PCR value will be different.

In some embodiments, a computing instance implemented on a virtualization host submits an attestation request to a local attestation device and is returned a response comprising a log of hash values representing all versions of a hypervisor previously and currently implemented on the virtualization host. Additionally, the response includes the PCR value. In some embodiments, the computing instance creates a timestamp for when the request is submitted to the attestation device and also creates a timestamp for when the response is received from the attestation device. An elapsed amount of time is computed between the sending of the request and the receiving of the response. This elapsed amount of time may be compared to a threshold amount of time. If the elapsed amount of time for receiving the response after submitting the request is less than the threshold amount of time, the computing instance may infer that the response came directly from the local attestation device, and therefore trust the contents of the response attestation package. If the elapsed amount of time for receiving the response is greater than the threshold amount of time, the computing device may not be able to definitely know that the response was generated by the local attestation device, and therefore may reject the response. In some embodiments, the comparisons of the time stamps may be performed at the computing device, at an attestation service, or both. In some embodiments, the computing device may additionally include a randomly generated "nonce" word in the request submitted to the attestation device. In such embodiments, the attestation device may return the nonce word in the response attestation package and/or a value that requires knowledge of the nonce word. In this way, the computing instance may verify that the response came from the local attestation device and was generated in response to the request submitted from the computing instance.

In some embodiments, the computing instance then provides an attestation package comprising the contents of the response received from the attestation device to an attestation service for authentication of the hypervisor (and/or operating system). In some embodiments, the attestation service is separately provided a copy of source code for hypervisor versions (and/or operating system versions) used at the virtualization host. The attestation service also stores/implements a same hash function as is used at the attestation device. Thus, the attestation service can compare the hash values of the log returned in the response to hash values for known authentic hypervisor versions (or known authentic operating system versions). Also, the attestation service can re-compute a PCR value by successively applying the hash values of the log and comparing the re-computed PCR value to the PCR value returned by the attestation device in the response. In this way, the attestation service can determine that all hypervisor versions that have been implemented on the computing instance are represented in the log and that all of the hypervisor versions included in the log correspond to authentic hypervisor versions. Note a similar process may be performed to authenticate operating system versions. If such verifications are successful, the attestation service may provide back to the computing instance an indication of the authenticity of the hypervisor (or operating system) currently implemented on the virtualization host and also indicate that no unauthorized hypervisor versions (or operating system versions) have previously been implemented.

In some embodiments, the attestation service and attestation device may be managed by a party that is independent of a service provider that manages the virtualization host and that provides the computing instance to a customer. In some embodiments, the attestation device may be provided cryptographic key material that is known by the independent party but that is not accessible by the service provider that manages the virtualization host and that provides the computing instance. In such embodiments, the attestation device may provide a cryptographic signature with the response, and this cryptographic signature may be included in an attestation package sent from the computing instance to the attestation service. The attestation service may verify that the contents of the attestation package originated at an authentic attestation device by comparing the cryptographic signature to cryptographic information known by the independent party managing the attestation service, but that is not known to the service provider that operates the virtualization host.

In some embodiments, the attestation service may be managed by a third-party auditor that is independent of the service provider that manages the virtualization host and that is independent of a customer of a virtualized computing service operated by the service provider. In some embodiments, the third-party auditor may be located in a different (neutral) political jurisdiction as compared to the service provider and/or customer. For example, the service provider providing virtualized computing resources may be based out of the United States, whereas the third-party providing the attestation service may be based out of the European Union, as an example.

In some embodiments, authentication of a hypervisor and previous hypervisor versions may be used to prevent exfiltration of customer data. For example, by verifying that only authenticated hypervisor versions have been implemented on a given virtualization host, trust may be established that back-doors or other security vulnerabilities have not been introduced on the virtualization host via unauthorized hypervisor versions. Also, in some embodiments, access to memory storing customer data related to a computing instance provided to the customer may be restricted to further prevent customer data exfiltration. In some embodiments, a computing instance may be provided an input/output memory management unit that the computing instance can use to set settings that block direct memory access to entities outside of the computing instance. Also, the computing instance may use the memory management unit to block access that would be required for live migration, as another example.

In some embodiments, a current hypervisor version hash is written to the log of the attestation device each time the virtualization host is booted. Also, live updates to the virtualization host cause a new hypervisor hash value to be written to the log of the attestation device.

Since the attestation device and the attestation service are separate from the CPU, various CPU designs may be used in a virtualization host that provides configuration authenticity attestation from within a computing instance. For example, whereas some confidential computing architectures limit data exfiltration in hardware and are therefore restricted in the hardware architectures that may be used for the CPUs, the attestation device and the attestation service, as described herein, may provide confidential compute functionality through policy controls without locking in any one particular CPU architecture that must be used.

In some embodiments, the attestation device may be implemented using an application specific integrated circuit (ASIC) configured with program instructions to implement the attestation device functionality, as described herein. In a similar manner, in some embodiments, a field programmable gate array (FPGA) may be configured to implement the attestation device functionality. Also, in some embodiments, other types of circuits or processor may be used. Also, in some embodiments, a system on a chip (SoC) may be configured to implement the attestation device functionality.

In at least some embodiments, attestation from within a computing instance, as described herein, may be implemented at a network-accessible service, such as a virtualized computing service (VCS) of a provider network, whose resources may be acquired by clients to implement various kinds of applications. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries). In other embodiments such techniques may be employed at standalone hosts that are not necessarily part of a network-accessible service. In at least some embodiments, clients on whose behalf computing instances are set up at virtualization servers may indicate, via one or more programmatic interactions, whether they wish to have attestation techniques similar to those introduced above performed for some or all of their computing instances, and/or to indicate the types of computing instances for which attestation should or should not be performed.

As one skilled in the art will appreciate in light of this disclosure, certain embodiments may be capable of achieving various advantages, including some or all of the following: (a) providing a customer with attestation as to the authenticity of a hypervisor and/or operating system used to implement a computing instance provided to the customer, (b) providing the customer with an auditable guarantee of authenticity, (c) preventing unauthorized back-doors or other vulnerabilities to be included in a computing instance provided to a customer, and/or (d) detecting a computing instance that may have been compromised via use of an altered hypervisor and/or operating system.

FIG. 1 illustrates an example system environment in which an attestation device at a host and a separate attestation service may enable computing instances to receive attestation that a given hypervisor used to implement the computing instance is authentic and/or that an operating system used to implement the computing instance is authentic. As shown, system 100 comprises a virtualization host 118 at which one or more computing instances 1116 (e.g., 116a through 116n) may be run, e.g., on behalf of one or more clients of a virtualized computing service. A computing instance may, for example, comprise a guest virtual machine in some embodiments, which in turn includes a guest operating system and one or more application programs that run on top of the guest operating system. One or more virtualization management components, such as a hypervisor 118 comprising one or more threads of execution running on the primary physical processors 114 of the virtualization host 118, and/or one or more offloaded virtualization management cards 110 (described below in further detail) may act as intermediaries between the computing instances 116 and at least some of the hardware components of the virtualization host 118 in the depicted embodiment. Note that the extent to which hardware devices are virtualized (as opposed to being managed directly from the guest operating system), and therefore the amount of work that is done, may vary for different kinds of computing instances 116. In one embodiment, a "bare-metal" computing instance may be established on behalf of a client at a server, and such a bare-metal instance may comprise various processes of an operating system that directly control at least a portion of the hardware of the server, without utilizing virtualization (although a small subset of the hardware functionality may be virtualized in some cases). Further, the performance capacities and lifetimes of different computing instances 1116 may vary substantially in at least some embodiments—some computing instances may be expected to run for months or years, and may perform compute-intensive tasks with the help of large amounts of memory, while others may be referred to as "micro" virtual machines, which are short lived and only require relatively small amounts of memory and compute resources. In at least some embodiments, various categories of computing instances may be supported, such as "large", "medium", "small" and "micro" computing instances, with respective levels of performance capacity along various dimensions such as processing, storage, memory and the like.

In some embodiments, attestation device 112 is connected to CPU and/or memory 114 via a local communication bus of the virtualization host 118, such as a PCIe connection. In some embodiments, attestation device 112 may include an ASIC, FPGA, SoC, or other processor that implements the attestation device functionality, such as computing hash values and storing the respective hash values in a log for different hypervisor versions and/or operating system versions. Also, the attestation device 112 may be configured to compute and store a platform configuration registry (PCR), wherein the PCR value represents a history of hypervisor version and/or operating system versions that have been implemented at the virtualization host 118.

In some embodiments, customers 106 of system 100 may represent various types of customers that request virtualized computing instances that are implemented via virtualization host 118, such as computing instances 116. In some embodiments, customers 106 may interact with virtualization host 118 via one or more networks 104. For example, in some embodiments, a public network may be used by customers 106 to reach a service provider network and an internal network of the service provider may be used to route communications to/from computing instances 116a through 116n via virtualization offloading card 110. In some embodiments, virtualization offloading card 110 may provide network interface virtualization for computing instances 116. However, access to memory used to implement computing instances 116 may be blocked for virtualization offloading card 110. In some embodiments, memory may be partitioned such that virtualization offloading card 110 is only allowed to access a first partition of the memory allocated for a given computing instance 116, whereas another portion of the memory allocated for the given computing instance 116 is restricted from being accessed by virtualization offloading card 110.

In some embodiments, attestation service 102 is operated by an independent party that is independent of a service provider that manages virtualization host 118 and that provides computing instances 116 to customers. For example, an operator of a service provider network may manage virtualization host 118 and provide computing instances 116 to customers of the service provider network. In such embodiments, a third-party or a customer 106 may operate the attestation service 102.

Figure 2:
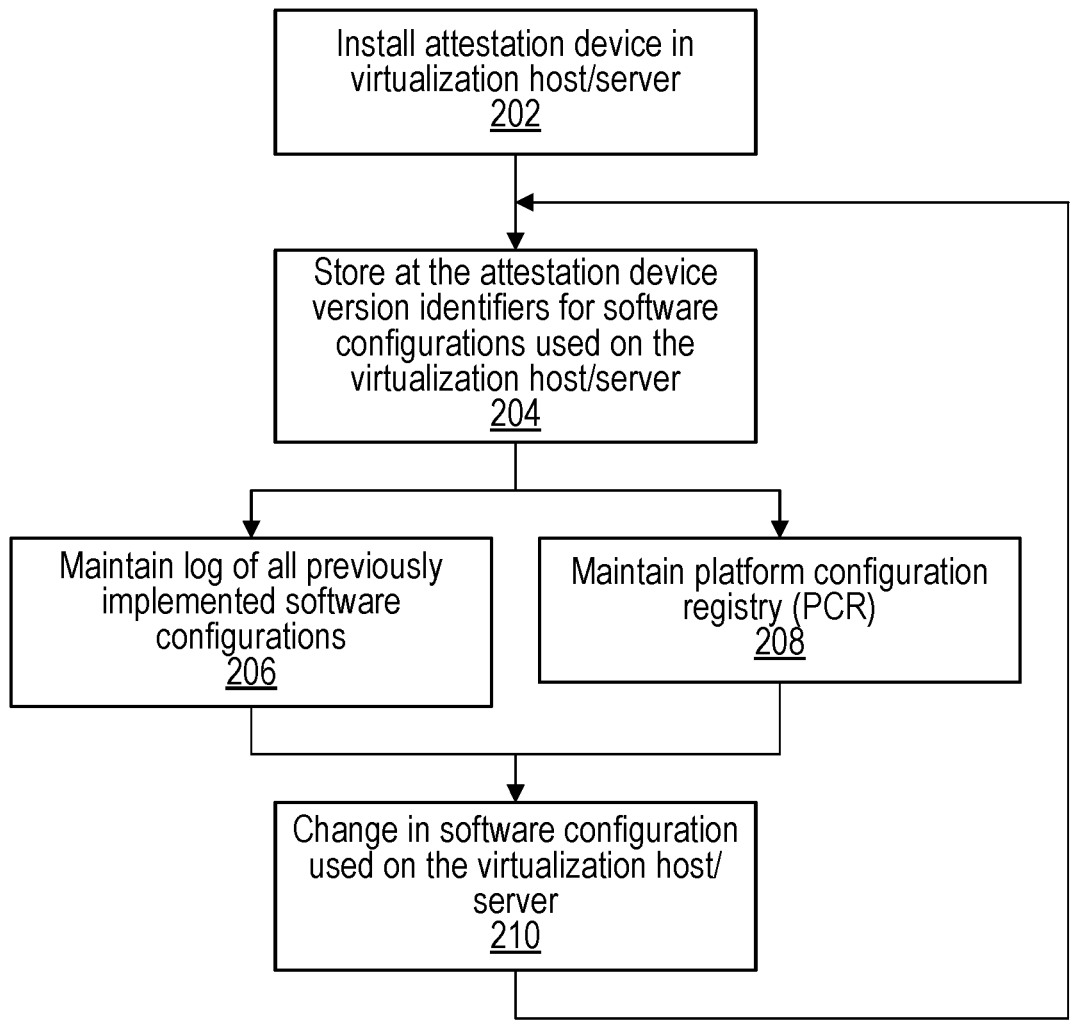
FIG. 2 illustrates a high-level view of an example sequence of events associated with configuring a virtualization host to include an attestation device and logging, by the attestation device, software configurations implemented on the virtualization host, according to some embodiments.

FIG. 2 illustrates a high-level view of an example sequence of events associated with configuring a virtualization host to include an attestation device and logging, by the attestation device, software configurations implemented on the virtualization host, according to some embodiments.

Figure 5:
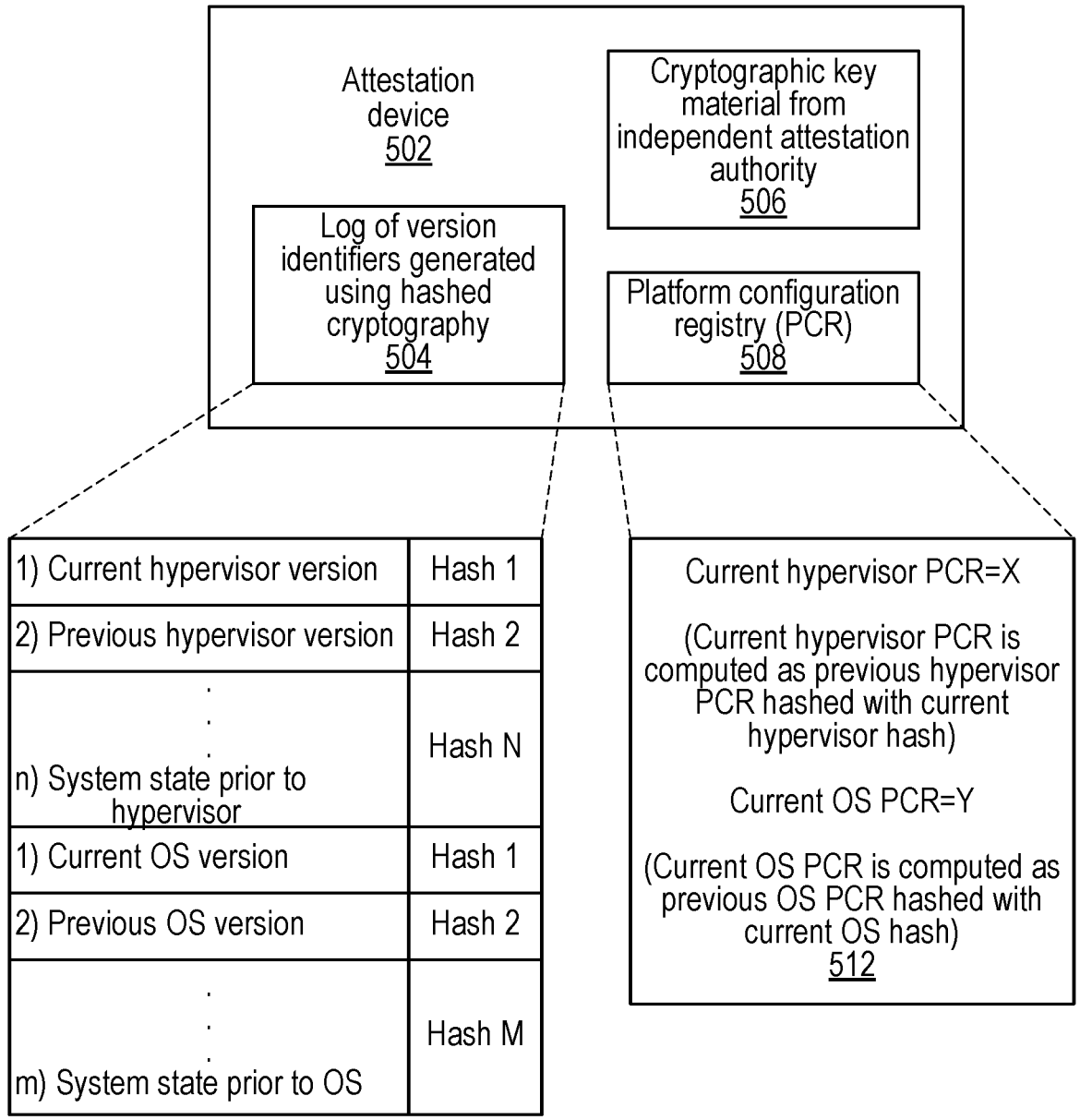
FIG. 5 illustrates an example attestation device which may be included in a server chassis with other server components, such as processors and memory, of a virtualization host, according to some embodiments.

At block 202, an attestation device is installed in a virtualization host/server. For example, attestation device 112 is installed in virtualization host 118. In some embodiments, attestation device 112 may be a separate piece of hardware that is mounted on a printed circuit board of the virtualization host 118. For example, attestation device 112 may include a processor, ASIC, FPGA, SoC, etc. and associated memory that implement the attestation device. In some embodiments, the attestation device may include similar components as shown in FIG. 5 for attestation device 502. In some embodiments, the attestation device may be provided by a third-party, such as the attestation service 102. For example, the attestation service may provide a pre-configured attestation device to a service provider to add to a server owned or managed by the service provider. However, the service provider may not be able to alter or access the attestation device, other than via providing software configurations upon boot that are used to generate updated hash values stored in the log of the attestation device.

At block 204, the attestation device stores version identifiers (e.g., hashes) for software configurations, such as for a hypervisor or instance operating system used on the virtualization host/server. In some embodiments, virtualization offloading card 110 may be configured to write a hash to a log of the attestation device 112 upon each system boot. Also, a live update feature managed by the virtualization offloading card 110 may be configured to write a hash to a log of the attestation device 122 upon performing a live update. In this way, all configuration changes for the hypervisor and/or operating system implemented at a virtualization host, such as virtualization host 118, may be recorded (via hashes) in the log of the attestation device 112. For example, at block 206, the attestation device maintains the log of all previously implemented software configurations, and at block 208, the attestation device maintains a platform configuration registry that protects against alterations of the log.

At block 210, in response to a change in the software configuration (e.g., hypervisor and/or operating system) used on the virtualization host/server, the process reverts back to block 204 and a current hash is added to the log as well as updating the platform configuration registry (PCR) to reflect the change in the software configuration used on the virtualization host.

Figure 3:
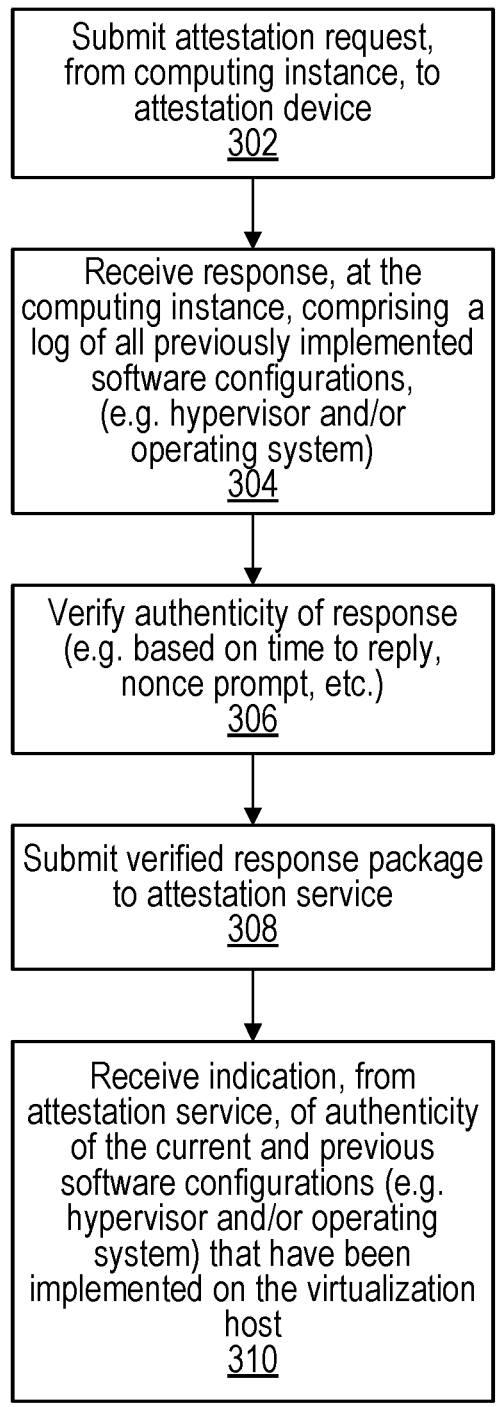
FIG. 3 illustrates a high-level view of an example sequence of events performed by a computing instance to authenticate a software configuration implemented on a virtualization host, hosting the computing instance, such as a hypervisor configuration and/or an operating system (OS) of the computing instance, according to some embodiments.

FIG. 3 illustrates a high-level view of an example sequence of events performed by a computing instance to authenticate a software configuration implemented on a virtualization host, hosting the computing instance, such as a hypervisor configuration and/or an operating system (OS) of the computing instance, according to some embodiments.

At block 302, a computing instance implemented on a virtualization host, such as one of computing instances 116 implemented on virtualization host 118, submits an attestation request (similar to the attestation request 602 shown in FIG. 6) to an attestation device, such as attestation device 112 (or attestation device 502 as shown in FIG. 5). The request may include a "nonce" term to be included in a response from the attestation device. The "nonce" term may be arbitrary or randomly generated and may be used to prevent an attestation device (or device attempting to emulate an attestation device) from using pre-cached responses. Because the attestation device will not know ahead of time the "nonce" word to be used in the request, the attestation device (or a device attempting to emulate the attestation device) cannot pre-cache responses. In some embodiments, wherein the attestation device stores logs of operating system versions and hypervisor versions, the request may indicate which software configuration (or both) that are to be attested to, e.g., the hypervisor software configuration, the operating system software configuration, or both.

At block 304, the computing instance receives a response package from the attestation device. The response package may include similar components as shown in FIG. 7 for response package 702, such as a log of hash values for all software configurations previously and currently implemented on the virtualization host (e.g., previous and current hypervisor versions and/or previous and current operating system versions). In some embodiments, the response package may also include a cryptographic signature generated using cryptographic key material of the attestation device. In some embodiments, the attestation device may come already loaded with cryptographic key material from a third party, wherein the third-party has knowledge of the cryptographic key material, but the operator and/or owner of the virtualization host does not have knowledge or access to the cryptographic key material. In this way, the cryptographic signature may be used to ensure that the attestation device is an authentic attestation device and has not been replaced with a manipulated attestation device, as an example.

At block 306, the instance further verifies the authenticity of the response (e.g., that the response actually came from the attestation device and did not come from some other source that is attempting to spoof the attestation device). In some embodiments, this verification may be performed using timestamps of when the request was sent and when the response was received. For example, the attestation device is locally mounted on a bus of the virtualization host, such as a PCIe card slot on a printed circuit board of the virtualization host. In some embodiments, a threshold amount of elapsed time between request and response may be used as a test to determine that the request came from the attestation device. For example, responses received after a greater elapsed amount of time may have originated somewhere other than the attestation device and may have been routed to a PCIe card. However, responses that are received in less than the threshold amount of elapsed time may be known to have originated at the attestation device because network latencies or other transmission latencies would cause a response originating at a further away location to not be received in less than the threshold amount of elapsed time. In some embodiments, the attestation service could alternatively or additionally verify the authenticity of a response from the attestation device using timestamp information included in an attestation package.

At block 308, the computing instance submits the contents of the response message as an attestation package to the attestation service, such as attestation service 102. The attestation package may include the contents of the response (such as the contents of response 702 as shown in FIG. 7) and may additionally include time stamps of when the request was sent and when the response was received. In some embodiments, the attestation service may compare the response time to the elapsed time threshold, and/or this analysis may be performed by the computing instance itself.

Figure 4:
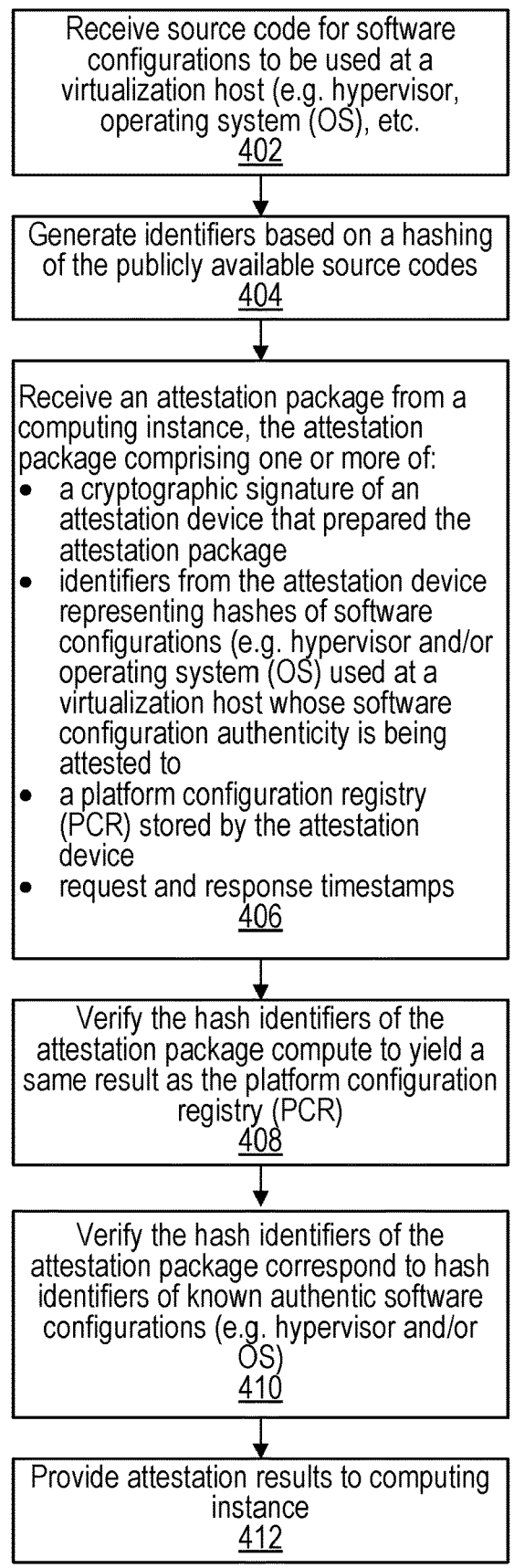
FIG. 4 illustrates a high-level view of an example sequence of events performed by an attestation service to authenticate a software configuration (e.g., hypervisor and/or or operating system) of a virtualization host and/or computing instance based on an attestation package generated by a local attestation device provided to the computing instance and forwarded to the attestation service, according to some embodiments.

FIG. 4 illustrates a high-level view of an example sequence of events performed by an attestation service to authenticate a software configuration (e.g., hypervisor and/or operating system) of a virtualization host and/or computing instance based on an attestation package generated by a local attestation device provided to the computing instance and forwarded to the attestation service, according to some embodiments.

At block 402, an attestation service, such as attestation service 102 receives or is otherwise provided source code for software configurations (e.g., hypervisor versions and/or operating system versions) to be used at a virtualization host. For example, the hypervisor versions may be shared publicly or may be shared between the service provider that manages the virtualization host and the attestation service (if not shared publicly). In some embodiments, the attestation service may further audit the source code for vulnerabilities.

At block 404, the attestation service generates identifiers (e.g., hash values) based on applying a hashing function to the source code received at block 402. The attestation service may store various identifiers (e.g., hash values) for various authenticated and audited versions of the source code, that correspond to various versions of the hyper visor (or operating system). These authenticated and audited versions may be considered to be trustworthy (e.g., no known back-doors, etc.). These generated identifiers may be used for comparison as further described below in order to validate software configurations deployed to a virtualization host that is hosting a computing instance that is requesting the attestation.

At block 406, the attestation service receives an attestation package from a computing instance that is requesting attestation of the hypervisor used to implement the computing instance and/or an operating system used by the computing instance. In some embodiments, the attestation package comprises: a cryptographic signature of an attestation device that prepared the attestation package; identifiers from the attestation device representing hashes of software configurations (e.g., hypervisor and/or operating systems (OSs)) used at a virtualization host whose software configuration authenticity is being attested to; a platform configuration registry (PCR) stored by the attestation device; and/or request and response timestamps.

At block 408, the attestation service uses the hash identifiers of the log to independently calculate a current platform configuration registry value (PCR) for the software configuration being attested to and compares the independently calculated PCR value to the PCR value that had been calculated by the attestation device and included in the response from the attestation device, and was later included in the attestation package forwarded to the attestation service. If the two PCR values match, then the attestation service can conclude that the log includes hash values for all hypervisor versions (or operating system versions, as the case may be) that have been implemented on the virtualization host.

At block 410, the attestation service then compares the hash values of the log entries representing the current hypervisor (or operating system) and the hash values of the previous versions of the hypervisor (or operating system). If each of the hash values of the log correspond to (e.g., match) hash values for known safe hypervisor versions, that are known to be trusted and/or have been audited, then the attestation service can conclude that the current and previous software configurations of the virtualizations host can be attested to be authentic. If so, at block 412, the attestation service provides the computing instance attestation results indicating that the software configuration is authentic. If not, the attestation service may provide negative results at block 412 indicating that the current software configuration of the virtualization host, hosting the computing instance submitting the request at block 406, cannot be authenticated.

In some embodiments, the attestation results may be provided to a service for example that ensures regulatory compliance for computing instances instead of or in addition to the attestation results being provided to the computing instance. In some embodiments, the attestation results may be provided in the form of cryptographic hash, token, signature, etc. that can be used to prove that the computing instance has been attested to be authentic. In some embodiments, the attestation service may store such proof without necessarily providing the attestation results back to the computing instance. In such embodiments, the proof stored by the attestation service may be audited to ensure compliance.

FIG. 5 illustrates an example attestation device which may be included in a server chassis with other server components, such as processors and memory, of a virtualization host, according to some embodiments.

In some embodiments, an attestation device, such as attestation device 502, includes cryptographic key material 506 used to generate cryptographic signatures that can be verified by an attestation service, such as attestation service 102 to verify authenticity of the attestation device 502. Also, the attestation device includes a memory or other storage that maintains a log 504 and a platform configuration registry 508. While, not shown, in some embodiments, attestation device 502 includes processing capacity to generate the hash values to be stored in the log 504 and to calculate the platform configuration registry value 508. In some embodiments, the log 504 may include entries for a system state prior to the installation of the hypervisor and additional entries for each previous (and current) hypervisor version installed on the virtualization host. In a similar manner, the log 504 (or another log) may include entries for a system state of the computing instance prior to installation of the operating system and additional entries for each previous (and current) operating system version installed on the computing instance. In some embodiments, the system state prior to installation of the hypervisor (or OS) may be recorded in the log using a cryptographic hash.

FIG. 6 illustrates contents of an example attestation request sent from a computing instance to an attestation device, according to some embodiments.

In some embodiments, an attestation request from a computing instance to an attestation device, such as attestation request 702, includes a unique identifier, such as a "nonce' word and/or a time stamp.

FIG. 7 illustrates example contents of a response (e.g., attestation package) provided to a computing instance from an attestation device, according to some embodiments.

In some embodiments, a response from an attestation device, such as response 702, includes a cryptographic signature of the attestation device, a repetition of the "nonce" term included with the request 602, a current software configuration identifier, such as a hash generated using the source code of the current software configuration, and a log of hashes representative of previous software configurations. Additionally, the response includes a platform configuration registry value that can be used to verify that the log is complete and has not been manipulated.

Figure 8:
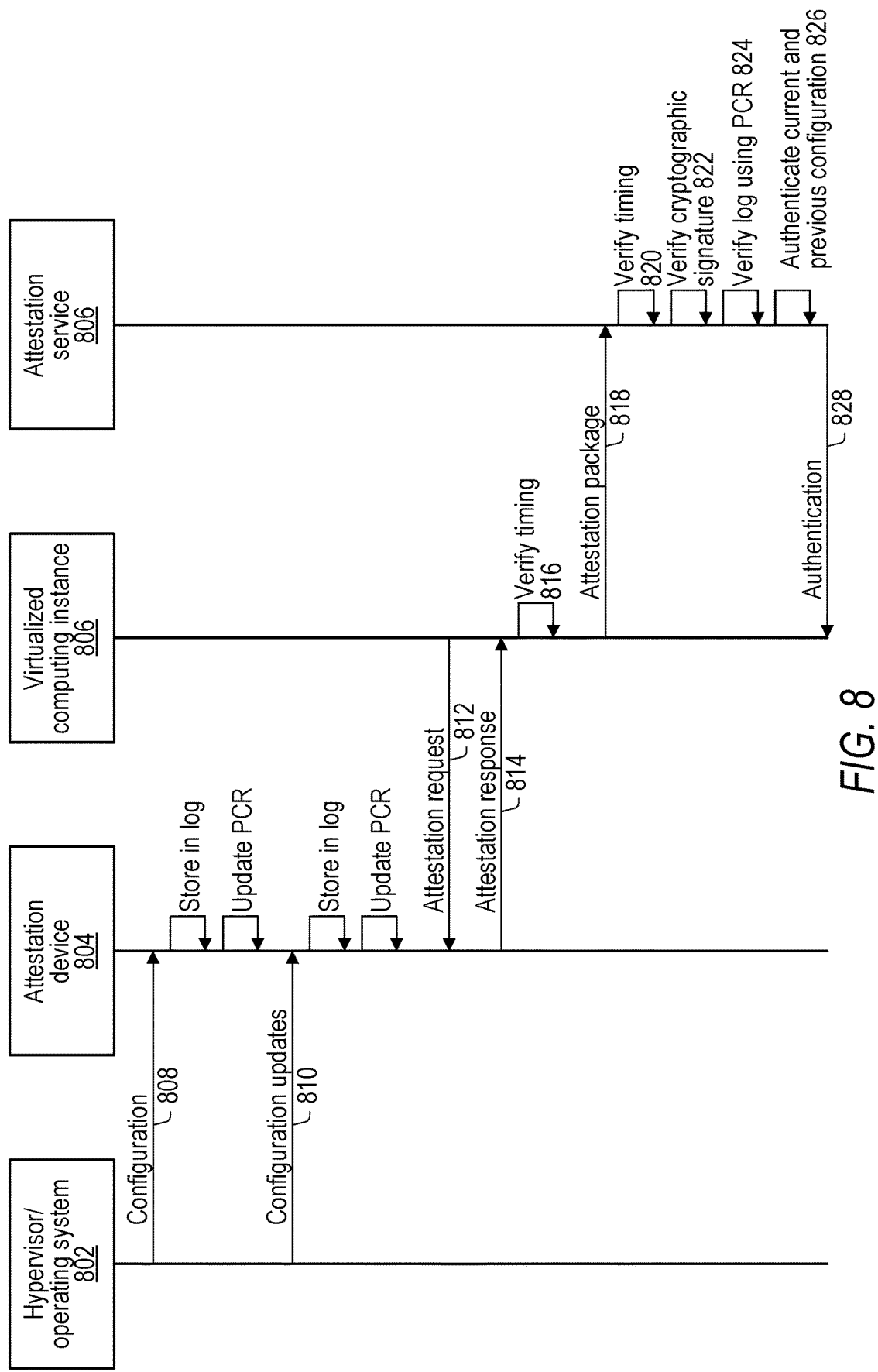
FIG. 8 illustrates example interactions between a hypervisor and/or operating system, an attestation device, an attestation service, and a computing instance, wherein the attestation device and the attestation service authenticate a configuration of the hypervisor and/or operating system used to implement the computing instance, according to some embodiments.

FIG. 8 illustrates example interactions between a hypervisor and/or operating system, an attestation device, an attestation service, and a computing instance, wherein the attestation device and the attestation service authenticate a configuration of the hypervisor and/or operating system used to implement the computing instance, according to some embodiments.

At step 808, the hypervisor of the virtualization host (or the operating system) 802 provides a configuration to the attestation device 804. The attestation device stores a hash value for the configuration 808 in its log and updates its PCR value. At step 810 a configuration update is performed and provided to attestation device 804, and the attestation device stores a hash value for the updated configuration 810 and updates its PCR value. At step 812, a virtualized computing instance implemented on the virtualization host implementing the hypervisor 802 (and/or operating system 802), submits an attestation request to the attestation device 804 and at step 814 the attestation deice 804 provides an attestation response package to the virtualized computing instance 806. At 816, the virtualized computing instance (and/or the attestation service) may validate the response by verifying the timing of the response. At step 818, the virtualized computing instance forwards the attestation package to the attestation service 806. At step 820, the attestation service (optionally) verifies the timing using timestamps included in the attestation package and at step 822 verifies a cryptographic signature included in the attestation package. At step 824, the attestation service verifies the log included in the attestation package using the platform configuration registry value included in the attestation package. Then, at step 826 the attestation service authenticates the current and previous software configurations (e.g., hypervisor/operating system 802) by comparing the hash values of the log to hash values of known trustworthy software configurations. Then, at step 828 the attestation service returns an authentication (or lack of authentication) message back to the virtualized computing instance 806.

Figure 9:
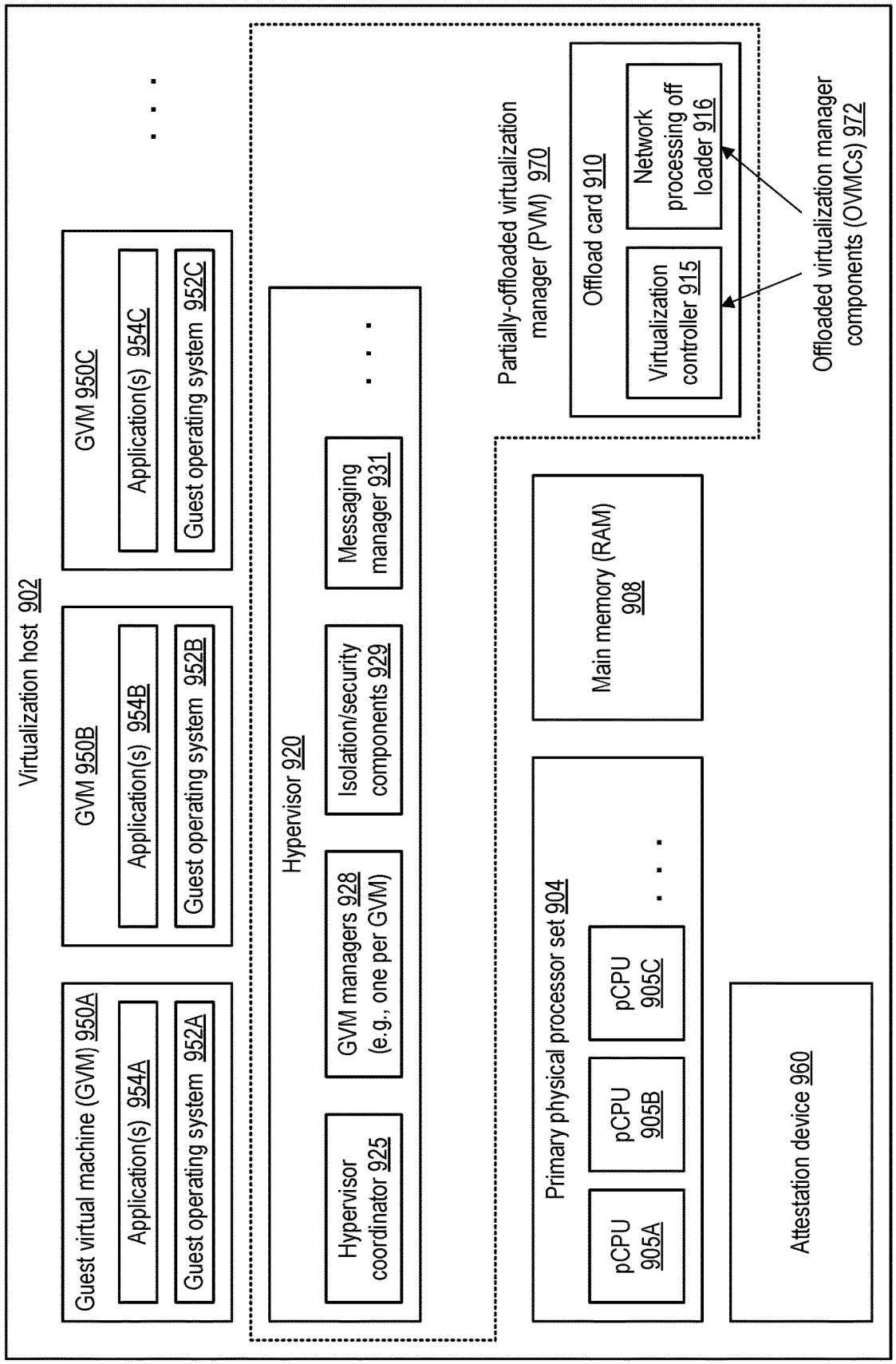
FIG. 9 illustrates an example virtualization host (e.g., virtualization server) at which an attestation device may be implemented, according to at least some embodiments.

FIG. 9 illustrates an example virtualization host 902, that implements attestation from within a computing instance, according to some embodiments. As shown, a virtualization host 902 (e.g., a virtualization server), similar in functionality and features to virtualization host 118 of FIG. 1, may comprise a primary physical processor set 404, a main memory (e.g., one or more modules of random access memory or RAM) 408, a partially-offloaded virtualization manager (PVM) 970 and zero or more guest virtual machines GVMs 950, such as GVMs 950A-950C. The primary physical processor set 904 may comprise a number of physical CPUs (pCPUs), including pCPUs 905A-905C in the depicted embodiment. The virtualization manager 970 may be referred to as being "partially offloaded" in the depicted embodiment because at least a portion of the processing or computations required for virtualization management may be undertaken at a peripheral card (offload card 910), thereby making more of the computational capacity of the physical processors available for guest virtual machines. Virtualized versions of the pCPUs, called vCPUs or virtual CPUs, may be allocated to individual GVMs by the PVM 970 during the lifetime of the GVMs. Each GVM 950 may comprise a respective instance of an operation system (e.g., guest operating systems 952A-952C) and a set of applications (e.g., 954A-954C) being run, for example, on behalf of clients of a virtualized computing service (VCS) of a provider network. As mentioned earlier, GVMs 950 may represent examples of computing instances in various embodiments.

The PVM 970 may comprise a hypervisor 920 (which uses the pCPUs) and one or more offloaded virtualization manager components (OVMCs) 972 which do not use the pCPUs in the depicted embodiment.

Opportunistic virtualization management components (OVMCs) 972 may include, for example, a virtualization controller 915 and a network processing offloader 916 in some embodiments. Individual ones of the OVMCs may be implemented using a respective system-on-chip design in some embodiments. Although both OVMCs 972 are shown as being incorporated within a single offload card 910 (e.g., a PCIe card) in the depicted embodiment, other approaches regarding the arrangement and organization of the OVMCs may be employed in different embodiments. For example, in one embodiment, a single system-on-chip implementation may be used to perform the functions of the virtualization controller and the network processing offloader, thereby eliminating the need for two different OVMCs. In another embodiment, respective offload cards may be used for the virtualization controller 915 and the network processing offloader 916. The virtualization controller, as suggested by its name, may be responsible for organizing or orchestrating much of the virtualization management work performed at the server 902 in the depicted embodiment—e.g., it may be the first of the components of the PVM to boot, it may trigger the launches of the other components of the PVM, it may communicate with a VCS control plane, it may make memory allocation decisions with respect to guest virtual machines, and so on. The network processing offloader 916 may be responsible for implementing one or more networking protocols (including for example an encapsulation protocol used within a VCS) and acting as an intermediary between the GVMs and networking endpoints outside the virtualization server in the depicted embodiment.

The hypervisor 920 may itself comprise a number of subcomponents in the depicted embodiment, including a hypervisor coordinator 925, one or more GVM managers 928, isolation/security components 929, and/or a messaging manager 931

Example Provider Network Environment

Figure 10:
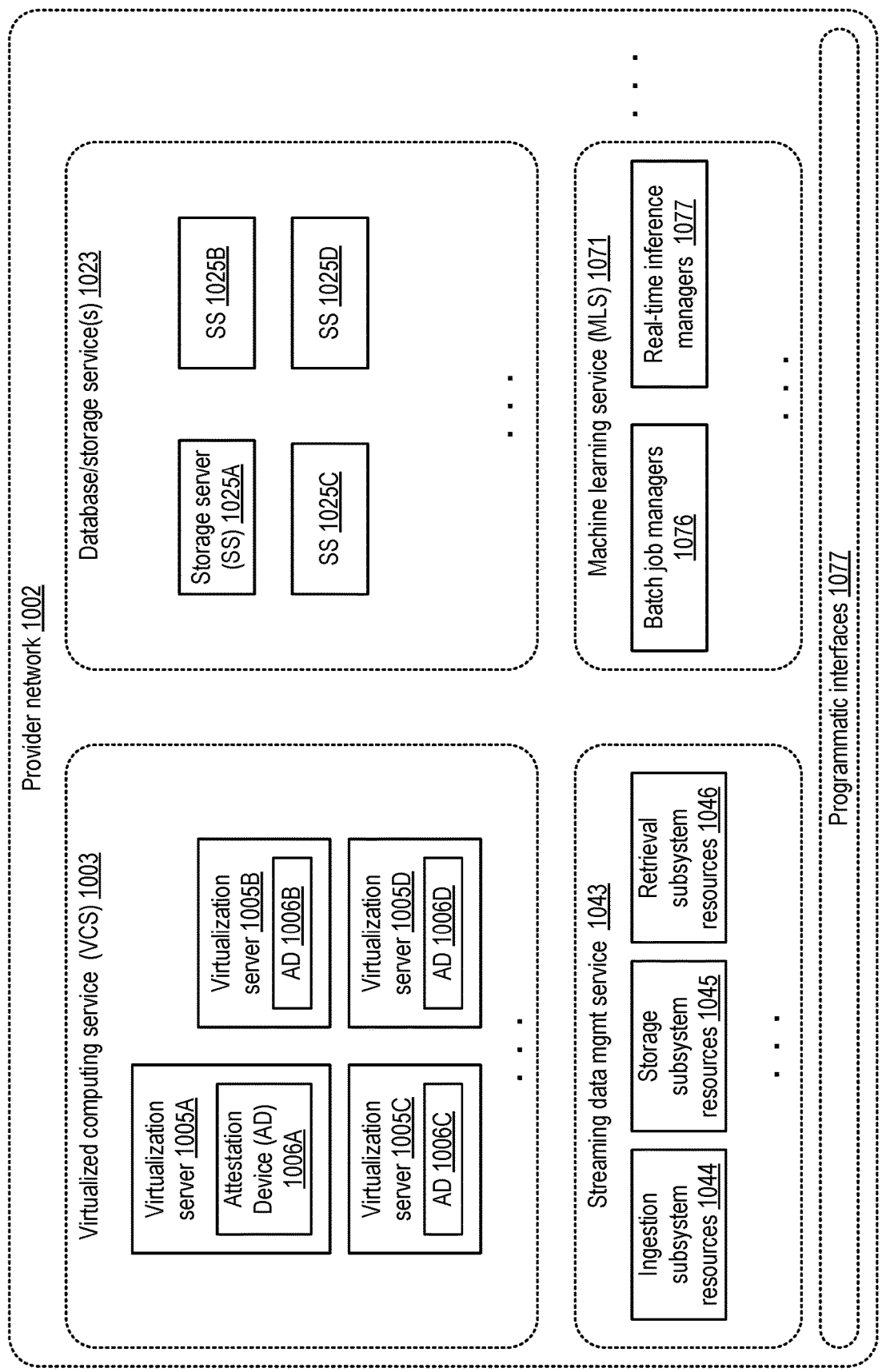
FIG. 10 illustrates an example provider network at which a virtualized computing service that supports configuration attestation from within computing instances may be implemented, according to at least some embodiments.

FIG. 10 illustrates an example provider network at which a virtualized computing service that supports attestation supported computing instances may be implemented, according to some embodiments. As indicated earlier, networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments.

The services implemented at provider network 1002 in the depicted embodiment may include, for example, a virtualized computing service (VCS) 1003, one or more database/storage service(s) 1023, a streaming data service 1043, and a machine learning service 1071. Numerous other services may also be implemented at the provider network 1002 in at least some embodiments. The VCS 1003 may comprise a plurality of virtualization servers 1005 (such as 1005A-1005D), similar in features and functionality of virtualization host 118 of FIG. 1, at which computing instances of various types may be instantiated for use by VCS clients in the depicted embodiment. At least some of the virtualization servers 1005 may comprise respective attestation devices 1006 (e.g., ADs 1006A-1006D at servers 1005A-1005D respectively), which provide attestation packages in response to attestation requests similar to those discussed above.

Database/storage service 1023 may comprise a plurality of storage servers 1025 (e.g., 1025A-1025D), at which database instances of various types (relational, object-oriented, key-value-based, and so on) and/or other types of storage objects may be set up on behalf of clients in various embodiments. In at least one embodiment, a storage service 1023 may comprise an object storage service that allows users to store unstructured data objects of arbitrary size, which can be retrieved using web services interfaces. In the depicted embodiment, a streaming data management service 1043 may comprise respective sets of resources for ingesting/acquiring high volumes of data records (e.g., from a distributed set of sensors, from logs generated at large numbers of computing systems, etc.), storing such records and retrieving such records from storage for consumption by various analysis applications. These three types of tasks may be performed, for example, using resources 1044 of an ingestion subsystem, resources 1045 of a storage subsystem, and resources 1046 of a retrieval subsystem respectively of the streaming data management service in some embodiments. Machine learning service 1071 may comprise batch job managers 1076 for long-running tasks such as training of machine learning models, as well as real-time inference managers 1077 for obtaining predictions from trained models in the depicted embodiment. In various embodiments, the input data to be consumed by one or more applications managed by the MLS 1071 may be stored at or managed with the help of one or more of the database/storage services 1023 and/or at streaming data service 1043. Similarly, in at least one embodiment, the destinations to which results/output of tasks performed at the MLS are provided may include devices within the database/storage services 1023. In one embodiment, one or more of the storage servers 1025 and/or other computing devices used at services other than the VCS 1003 may also include respective attestation devices, such as Ads 1006A-D.

Individual ones of the services of provider network 1002 may expose respective sets of programmatic interfaces 1077 to its clients in the depicted embodiment. In general, several of the services may utilize resources of other services (for example, the streaming data management service 1043 may also utilize computing instances of the virtualized computing service 1003 and storage devices provided by the database/storage services 1023). As such, various services of provider network 1002 may act as clients of other services, and may utilize the programmatic interfaces of the other services in the depicted embodiment. Such programmatic interfaces may also be used by clients of the provider network to submit attestation related requests in at least one embodiment. In some embodiments, at least some of the techniques discussed above for implementing attestation may be implemented at resources that are not part of network-accessible services such as those shown in FIG. 10.

Illustrative Computer System

Figure 11:
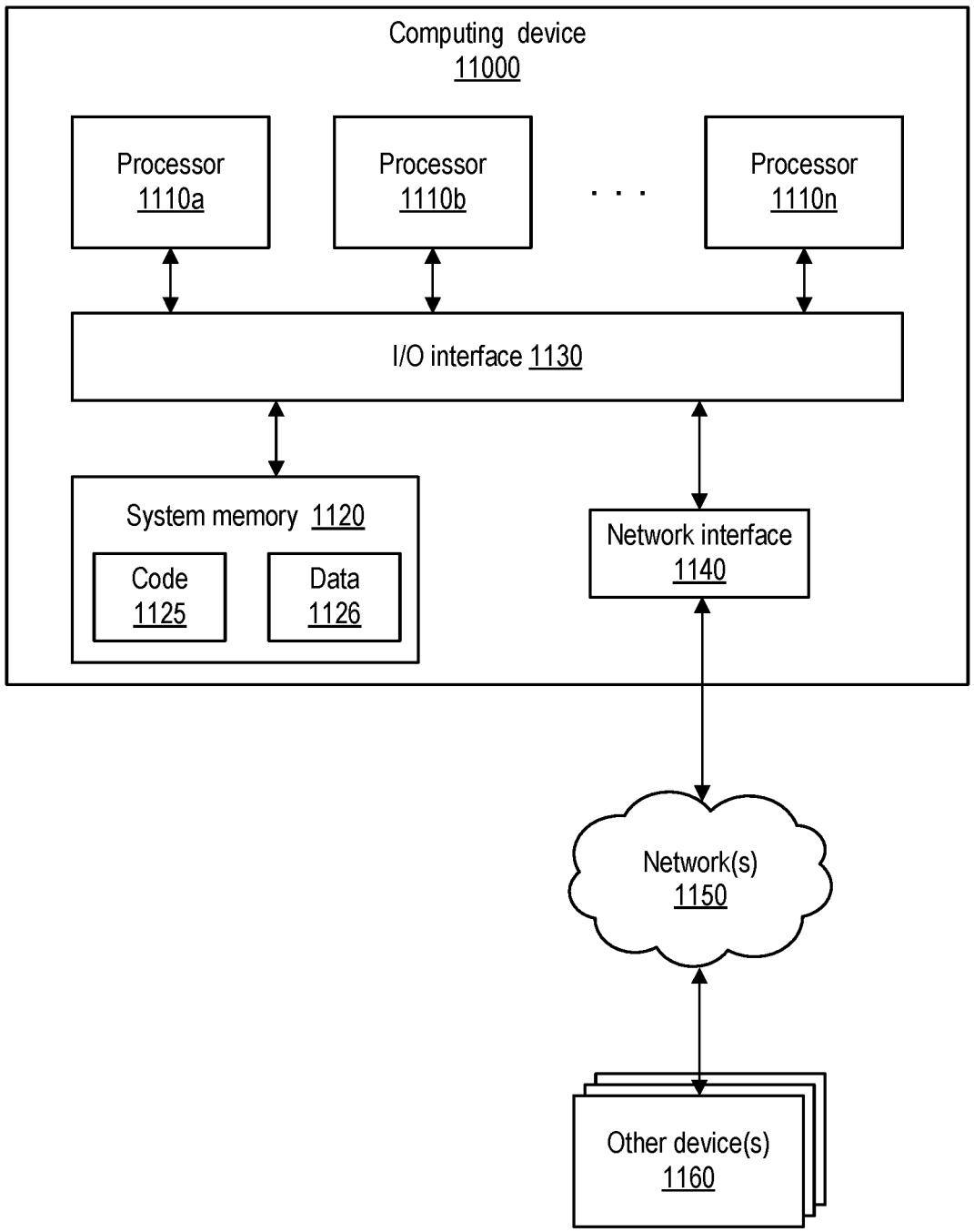
FIG. 11 is a block diagram illustrating an example computing device that may be used in at least some embodiments.

In at least some embodiments, a server that implements a portion or all of one or more of the technologies described herein, including attestation, virtualization management components, administrative as well as data plane components of various network-accessible services such as a virtualized computing service and the like may include a general-purpose computer system that includes or is configured to access one or more computer-accessible media. FIG. 11 illustrates such a general-purpose computing device 1100. In the illustrated embodiment, computing device 1100 includes one or more processors 1110 coupled to a system memory 1120 (which may comprise both non-volatile and volatile memory modules) via an input/output (I/O) interface 1130. Computing device 1100 further includes a network interface 1140 coupled to I/O interface 1130. In at least some embodiments computing device 1100 may include a motherboard to which some or all of such components may be attached. While not shown, in some embodiments, computing device 1100 further includes an attestation device 112 (as shown in FIG. 1).

In various embodiments, computing device 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA. In some implementations, graphics processing units (GPUs) may be used instead of, or in addition to, conventional processors.

System memory 1120 may be configured to store instructions and data accessible by processor(s) 1110. In at least some embodiments, the system memory 1120 may comprise both volatile and non-volatile portions; in other embodiments, only volatile memory may be used. In various embodiments, the volatile portion of system memory 1120 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces such as various types of persistent and/or volatile storage devices. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computing device 1100 and other devices 1160 attached to a network or networks 1150, such as other computer systems or devices as illustrated in FIG. 1 through FIG. 10, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks such as Fibre Channel SANs, or via any other suitable type of network and/or protocol. Network interface 1140 and/or other I/O devices 1160 may represent examples of an attestation service for which attestation techniques described earlier may be implemented in at least some embodiments.

In some embodiments, system memory 1120 may be one embodiment of a computer-accessible medium configured to store program instructions and data as described above for FIG. 1 through FIG. 10 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1100 via I/O interface 1130. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 1100 as system memory 1120 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 1140. Portions or all of multiple computing devices such as that illustrated in FIG. 11 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A virtualization host, comprising:
an attestation device;
a memory storing program instructions; and
one or more processors, wherein the program instructions, when executed using the one or more processors cause the one or more processors to:
  implement a hypervisor for the virtualization host; and
  implement one or more virtualized computing instances on the virtualization host,
wherein a given one of the one or more virtualized computing instances is configured to:
  submit a hypervisor attestation request to the attestation device, wherein the attestation device stores a hashed identifier of a current version of the hypervisor implemented on the virtualization host and a log of hashed identifiers of all previous versions of the hypervisor that have been implemented on the virtualization host;
  receive, from the attestation device, a response comprising:
    the hashed identifier of the current version of the hypervisor;
    the log of hashed version identifiers of previous versions of the hypervisor; and
    a platform configuration registry value, wherein the platform configuration registry value is maintained at the attestation device via a hashing function that is calculated using a previous platform configuration registry value hashed with a new hashed identifier for a new version of the hypervisor, each time a new version of the hypervisor is implemented on the virtualization host;
submit the received identifier of the current version of the hypervisor, the log, and the platform configuration registry to an attestation service, wherein the attestation service stores a hashed identifier generated from a publicly available copy of the current version of the hypervisor that has been authenticated and also stores hashed identifiers generated from publicly available copies of the previous versions of the hypervisor that have been authenticated, wherein comparing the hashed identifiers generated by the attestation device and stored in the log of the attestation device to the hashed identifiers stored at the attestation service verifies, if matching, that the current and previous versions of the hypervisor implemented on the virtualization host are authenticated versions of the hypervisor; and
receive from the attestation service confirmation that the current and previous versions of the hypervisor implemented on the virtualization host are authenticated versions of the hypervisor.

2. The virtualization host of claim 1,
wherein the attestation device and the one or more processors are connected via a PCIe bus, and
wherein the given one of the one or more virtualized computing instances is further configured to:
generate a timestamp for a time the request was submitted;
determine, based on the timestamp generated for the request and a time at which the response is received at the given virtualized computing instance, an elapsed time for the attestation device to respond to the request; and
invalidate the response received from the attestation device if the elapsed time for the attestation device to respond to the request is greater than a threshold amount of time.

3. The virtualization host of claim 1, wherein the attestation service is operated by a third-party other than an operator of a service provider network of which the virtualization host is a part.

4. The virtualization host of claim 3, wherein the attestation device is supplied for inclusion in the virtualization host from the third-party and comprises encryption key material known by the third-party but inaccessible to the operator of the service provider network, wherein the attestation device is configured to sign the response with an encrypted signature encrypted using the encryption key material included in the attestation device.

5. The virtualization host of claim 1, wherein the given one of the one or more virtualized computing instances is further configured to:
include with the request a randomly generated nonce word; and
verify that the response includes the randomly generated nonce word or a value that requires knowledge of the randomly generated nonce word, wherein said verification confirms that the attestation device is uniquely responding to the request submitted by the given virtualized computing instance.

6. The virtualization host of claim 1, wherein the attestation device is implemented using:
an application specific integrated circuit (ASIC), wherein the ASIC is connected on a communication bus with the one or more processors of the virtualization host;
a field programmable gate array (FPGA), wherein the FPGA is connected on a communication bus with the one or more processors of the virtualization host; or
a system on a chip (SoC), wherein the SoC is connected on a communication bus with the one or more processors of the virtualization host.

7. The virtualization host of claim 1, wherein the given one of the one or more virtualized computing instances is further configured to:
submit an operating system (OS) attestation request to the attestation device, wherein the attestation device stores a hashed identifier of a current version of the OS running on the computing instance and a log of hashed identifiers of all previous versions of the OS that have been implemented on the computing instance;
receive, from the attestation device, a response comprising:
the hashed identifier of the current version of the OS;
the log of hashed identifiers of previous versions of the OS; and
submit the received hashed identifier of the current version of the OS and the log of hashed identifiers of previous versions of the OS to the attestation service, wherein the attestation service stores a hashed identifier generated from a publicly available copy of the current version of the OS that has been authenticated and also stores hashed identifiers generated from publicly available copies of the previous versions of the OS that have been authenticated, wherein comparing the hashed identifiers generated by the attestation device and stored in the log to the hashed identifiers stored at the attestation service verifies, if matching, that the current and previous versions of the OS implemented on computing instance are authenticated versions of the OS; and
receive from the attestation service confirmation that the current and previous versions of the OS implemented on the computing instance are authenticated versions of the OS.

8. A method, comprising:
submitting a configuration attestation request to an attestation device, wherein the attestation device stores data describing a current software configuration used at a virtualization host and a log of data items describing previous software configurations used at the virtualization host;
receiving, from the attestation device, a response comprising:
the data descriptive of the current software configuration used at the virtualization host; and
the log of data descriptive of the previous software configurations used at the virtualization host;
submitting the received data descriptive of the current software configuration and the log to an attestation service, wherein the attestation service stores corresponding description data generated from publicly available copies of the current and the previous software configurations that have been authenticated, wherein comparing the corresponding data items received from the attestation device with those stored at the attestation service provides an indication as to whether an inauthentic software configuration has been implemented at the virtualization host; and
receiving from the attestation service confirmation that the current and previous software configurations implemented on the virtualization host are authentic.

9. The method of claim 8, wherein the attestation device comprises an applications specific integrated circuit (ASIC), field programmable gate array (FPGA), or system on a chip (SoC), connected to the PCIe bus.

10. The method of claim 9, further comprising:
determining the response from the attestation device was received via the PCIe bus at the one or more processors within a threshold amount of time since the configuration attestation request was submitted, wherein responses received after an elapsed time greater than the threshold amount are invalidated.

11. The method of claim 10, wherein said determining the response from the attestation device was received via the PCIe bus at the one or more processors within a threshold amount of time is performed:
at a computing instance implemented on the virtualization host that submitted the attestation request;
at the attestation service; or
at both the computing instance and the attestation service.

12. The method of claim 8, wherein the attestation service is operated by a different party than a service provider operating a service provider network comprising the virtualization host.

13. The method of claim 12, wherein the different party is a customer of the service provider network that is provided a computing instance implemented on the virtualization host.

14. The method of claim 12, wherein the different party is a third-party different from the operator of the service provider network and different from a customer of the service provider network to whom a computing instance implemented on the virtualization host is provided.

15. The method of claim 14, wherein the operator of the service provider network is located within a first political jurisdiction and the third-party is located in a different political jurisdiction.

16. The method of claim 8, wherein the software configuration being authenticated via the attestation device and the attestation service comprises a hypervisor version that is being authenticated.

17. The method of claim 8 wherein the software configuration being authenticated via the attestation device and the attestation service comprises an operating system (OS) version that is being authenticated.

18. One or more non-transitory, computer-readable, storage media storing program instructions that, when executed on or across one or more processors, cause the one or more processors to:
submit a hypervisor attestation request to an attestation device;
receive, from the attestation device, a response comprising data descriptive of a current version of a hypervisor;
submit the received data to a third-party attestation service; and
receive from the third-party attestation service confirmation that the current version of the hypervisor is authentic.

19. The one or more non-transitory, computer-readable, storage media of claim 18, wherein the program instructions, when executed on or across the one or more processors, further cause the one or more processors to:
determine an amount of time that elapses between submitting the request and receiving the response, wherein authenticity of the hypervisor is not guaranteed if the elapsed amount of time between the request and the response exceeds a threshold amount of time.

20. The one or more non-transitory, computer-readable, storage media of claim 18, wherein the program instructions, when executed on or across the one or more processors, further cause the one or more processors to:
include with the request an arbitrarily generated nonce term; and
determine whether the arbitrarily generated nonce term or a value derived from the arbitrarily generated nonce term is included with the response, wherein authenticity of the hypervisor is not guaranteed if the response lacks the arbitrarily generated nonce term or the value derived from the arbitrarily generated nonce term.

* * * * *